United States Patent [19]

Lockhart et al.

[11] Patent Number: 5,311,745
[45] Date of Patent: May 17, 1994

[54] PRESSURE MEASUREMENT SYSTEM FOR REFRIGERATION SYSTEM

[75] Inventors: Douglas L. Lockhart, Cobble Hill; Oreste B. N. Varelas, Vancouver, both of Canada

[73] Assignee: Digi-Cool Industries Ltd., Duncan, Canada

[21] Appl. No.: 9,671

[22] Filed: Jan. 27, 1993

[51] Int. Cl.$^5$ ............................................. G05D 23/00
[52] U.S. Cl. ........................................ 62/127; 62/129
[58] Field of Search ............... 62/125, 126, 127, 129, 62/149, 292, 298

[56] References Cited

U.S. PATENT DOCUMENTS

| | | | |
|---|---|---|---|
| 4,106,306 | 8/1978 | Saunders | 62/149 |
| 4,114,448 | 9/1978 | Merritt | 62/129 |
| 4,798,055 | 1/1989 | Murray et al. | 62/127 |
| 5,209,076 | 5/1993 | Kauffman et al. | 62/127 X |
| 5,209,400 | 5/1993 | Winslow et al. | 62/127 X |

Primary Examiner—Harry B. Tanner
Attorney, Agent, or Firm—Elbie R. DeKock; John R. Uren

[57] ABSTRACT

A pressure measuring system for a refrigeration system, such as a refrigeration system used in a commercial air conditioning system, comprises a converter (42) for converting a pressure being measured into a digital signal representing the measured pressure and a processor (54) for calculating a corresponding boiling point temperature for a selected refrigerant at the measured temperature. The system also includes a selector for selectively inputting the boiling point temperature-pressure relationship or coefficient of a selected refrigerant into the processor, as well as a display (60) for displaying the measured pressure and the calculated boiling point temperature.

6 Claims, 3 Drawing Sheets

PRESSURE MEASUREMENT SYSTEM FOR REFRIGERATION SYSTEM

FIELD OF THE INVENTION

This invention relates to a pressure measuring system for a refrigeration system, e.g., a refrigeration system for a commercial air conditioning system.

BACKGROUND OF THE INVENTION

In order to measure or monitor whether a refrigeration system is operating correctly or to diagnose a problem, it is necessary to measure the pressure of the refrigerant in either of the high and low pressure sides of the system or both. Basically, the conventional units which are used for this purpose are manifolds with flexible tubes which are connected to pressure nipples provided on the refrigeration system. The manifolds are provided with analog gauges. One gauge is connected to the high pressure side and one gauge is connected to the low pressure side of the refrigeration system. The gauges measure pressure but corresponding boiling point or saturation temperature values are given for the refrigerant at the different pressure values. The boiling point or saturation temperature is the temperature at which a phase change between the vapour and liquid phases occurs for the refrigerant at a particular pressure.

It is an object of the present invention to provide a pressure measuring system which will facilitate the operations of carrying out pressure measurements and obtaining corresponding boiling point temperature values for different refrigerants.

SUMMARY OF THE INVENTION

According to the invention, there is provided a pressure measuring system for a refrigeration system, comprising conversion means for converting a pressure being measured into a digital signal representing said measured pressure; processing means for calculating a corresponding boiling point temperature for a selected refrigerant at said measured pressure; refrigerant selection means for selectively inputting into said processing means the boiling point temperature-pressure relationship or coefficient of said selected refrigerant; and display means for displaying said measured pressure and the calculated boiling point temperature. The refrigerant selection means may comprise a memory for storing the boiling point temperature-pressure relationship of a plurality of different refrigerants or, alternatively, the refrigerant selection means may comprise an interface for receiving a plug-in memory chip containing the boiling point temperature-pressure relationship of a particular refrigerant.

The processing means may further comprise means for continuously performing successive calculations as said measured temperature varies with time and update means for updating the pressure and boiling point temperature values displayed by said display means at predetermined intervals, as well as control means for selectively determining the length of said predetermined time intervals.

The pressure measuring system may further comprise secondary control means for activating said display means to indicate the direction of a pressure change, upward or downward, during said predetermined time intervals in between said updating of the pressure and temperature values.

The invention also extends to a refrigeration system including a pressure measuring system as described.

Further objects and advantages of the invention will become apparent from the description of a preferred embodiment of the invention below.

DETAILED DESCRIPTION OF PREFERRED EMBODIMENT

Figure 1:
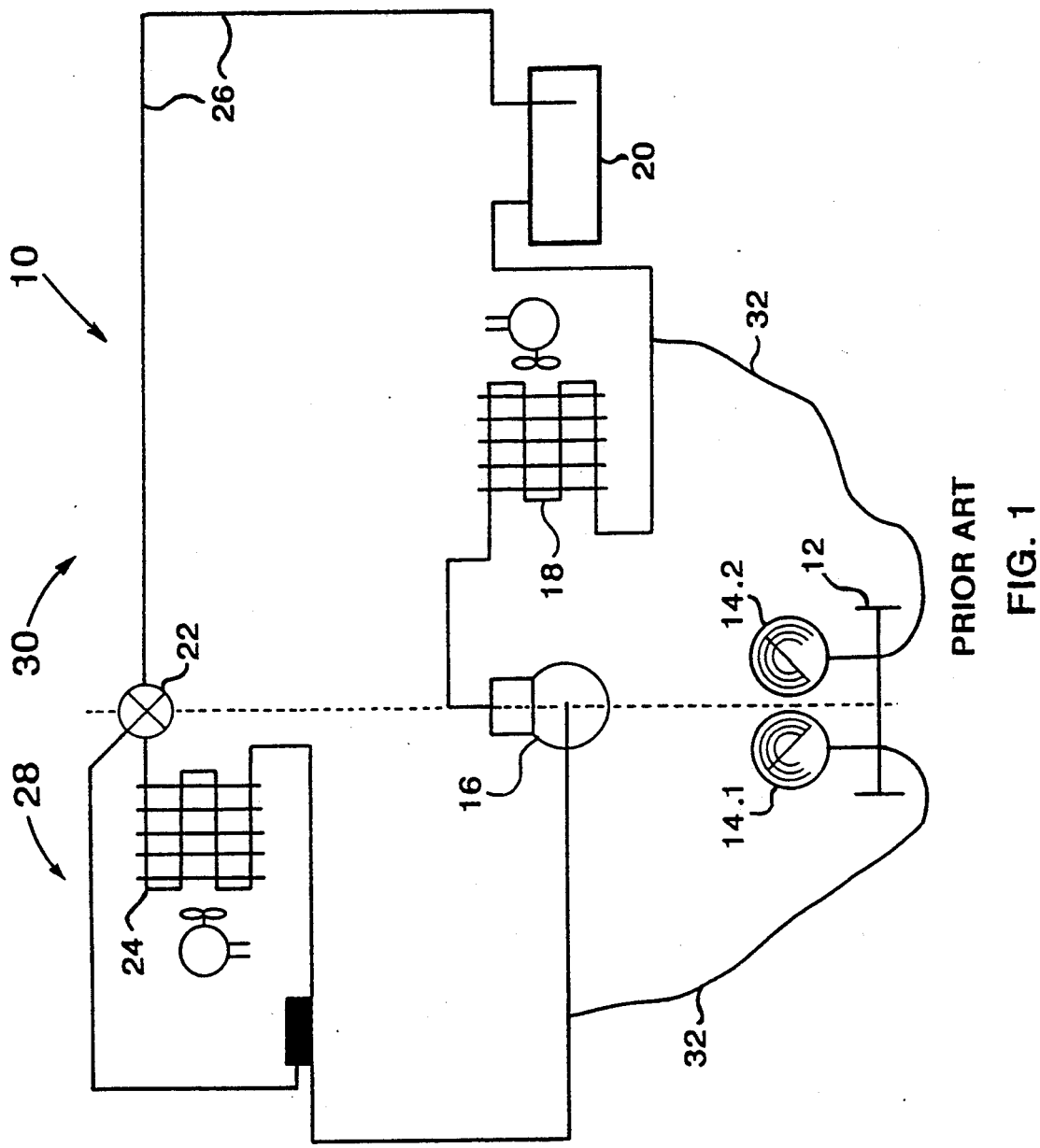
FIG. 1 is a diagrammatical representation of a refrigeration system 10 to which a conventional manifold with analog gauges is connected.

With reference to FIG. 1, a refrigeration system 10, to which a conventional manifold 12 with analog gauges 14.1 and 14.2 is connected, is shown.

The refrigeration system 10 comprises a compressor 16, a condenser 18, a liquid receiver 20, an expansion valve 22 and an evaporation unit 24, which are all connected in a closed circuit by means of conduits 26. A refrigerant is circulated in the circuit. The system 10 has a low pressure side 28 and a high pressure side 30.

In a typical example, the refrigerant, e.g., "R-12" in vapour form enters the compressor 16 at a pressure of about 20 psig (138 kPA) and is compressed to about 100 psig (690 kPA). This adiabatically compresses the refrigerant and the temperature is raised to about 130° F. (55° C.). The compressed vapour then goes through the condenser 18 where it is latently cooled. It is thereafter collected in the liquid collector 20.

The liquid refrigerant is released to a lower pressure through the expansion valve 22, resulting in evaporation of the refrigerant in the evaporation unit 24 and cooling to about 18.5° F. (−7.5° C.). Thereafter the refrigerant again goes to the compressor 16 where it is compressed and the cycle is repeated.

As shown in FIG. 1, in the conventional method, the analog gauges 14.1 and 14.2 are respectively connected, by means of flexible tubes 32, to the low pressure side 28 and the high pressure side 30 of the refrigeration system 10. These gauges 14.1 and 14.2 are calibrated to indicate the pressure of the refrigerant, as well as to show the corresponding saturation temperature or boiling point.

Figure 2:
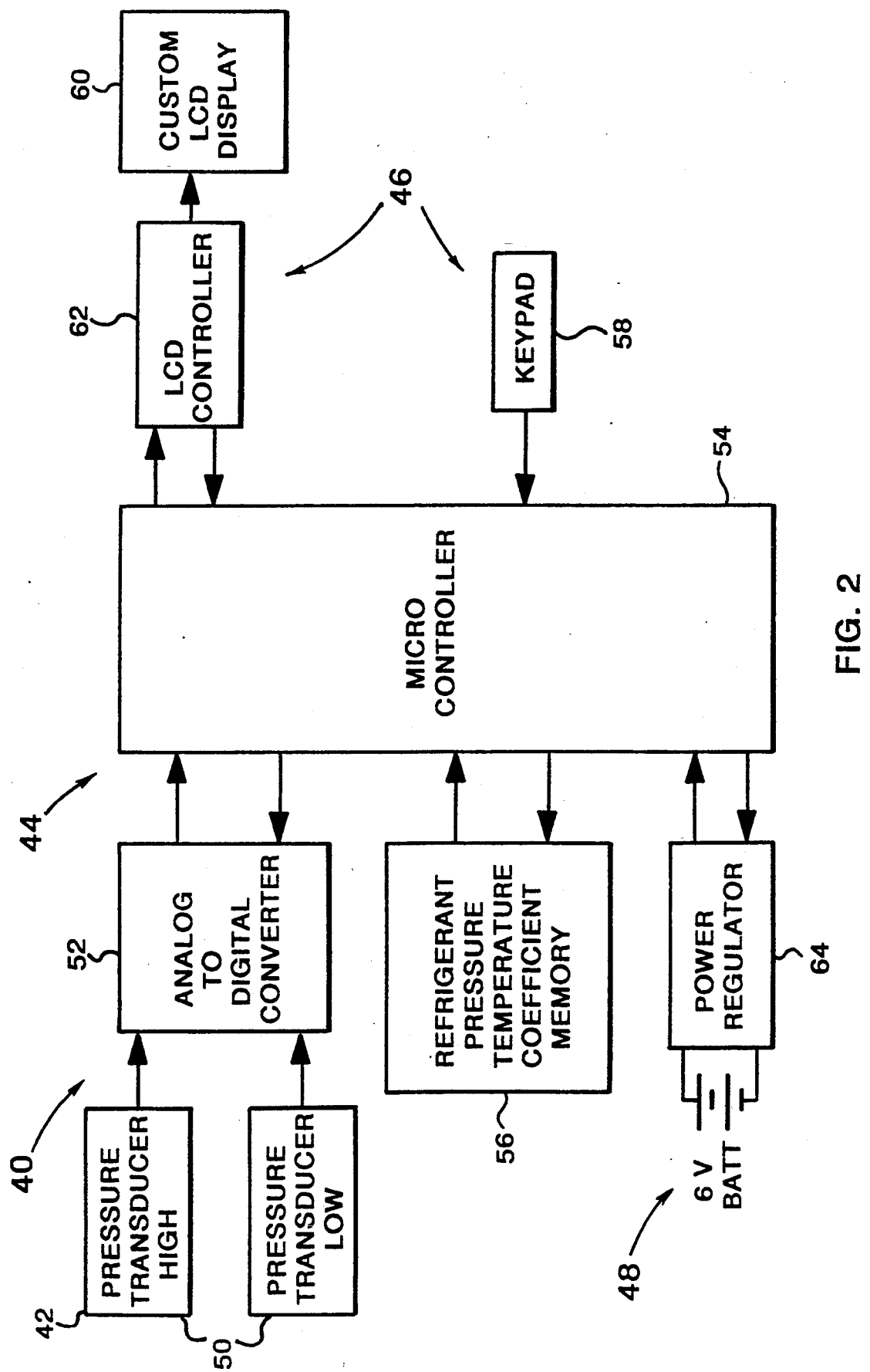
FIG. 2 is a block diagram of a pressure measuring system according to the invention.

With reference now to FIG. 2, a block diagram of a pressure measuring system 40 according to the invention is shown. The system 40 comprises four basic sections, i.e. a pressure transducer section 42, a digital processor section 44, an input/output section 46 and a power supply section 48.

The pressure transducer section 42 comprises transducers 50 with high voltage outputs for converting the pressures measured in the high and low pressure sections to electric signals. The system 40 can conveniently be installed on a conventional manifold which is connected to the high and low pressure sides 28, 30 by means of flexible tubes. The pressure transducers 50 will then be arranged so that they are exposed to the high and low pressures through the flexible tubes.

The pressure transducer section 42 further includes an analog to digital converter 52 to convert the analog signals from the pressure transducers 50 into digital signals which can be interpreted by the digital processor section 44.

The pressure transducers 50 may comprise capacitor ceramic elements that change the distance of two closely spaced plates as the pressure changes; or they may comprise semi-conductor strain elements that change the resistance of a silicon bridge as pressure (strain) is varied; or they may comprise foil strain elements that change the resistance of a silicon bridge as pressure (strain) is varied.

The arrangement may be such that the transducers 50 provide the "raw" signal as an output or, alternatively, converted to a proportional voltage, current or frequency. Any suitable output or element type may be used with the current output application. A frequency output provides the simplest interface to the digital processor section 44 as the signal requires no conversion. It can be connected directly to a timing counter which is provided on most microprocessors. Current and voltage outputs require analog to digital converters, such as the converter 52, shown in FIG. 2. Transducers that have raw outputs generally require an amplifier (not shown) in addition to the converter 52.

The digital processor section 44 comprises a microprocessor 54 and a memory 56. The input/output section 46 comprises a pressure-operated keypad 58 and an LCD display 60.

The microprocessor 54 is responsible for processing the digital pressure information and data or instructions input through the keypad 58 and for outputting the processed information to the LCD display 60.

The memory 56 contains the appropriate refrigerant pressure-temperature coefficients that enable boiling point temperature to be calculated for different refrigerants at specified pressures. The memory 56 may comprise a ROM, EPROM or EEPROM device. In the present example, the memory 56 comprises an EEPROM device that can be replaced or substituted by another. This feature allows easy conversion or upgrade of the system in the field for new refrigerants.

An extra memory (not shown) can be included to provide for logging of the measured pressures. This logged information can be uploaded to a computer for further processing and system analysis.

Figure 3:
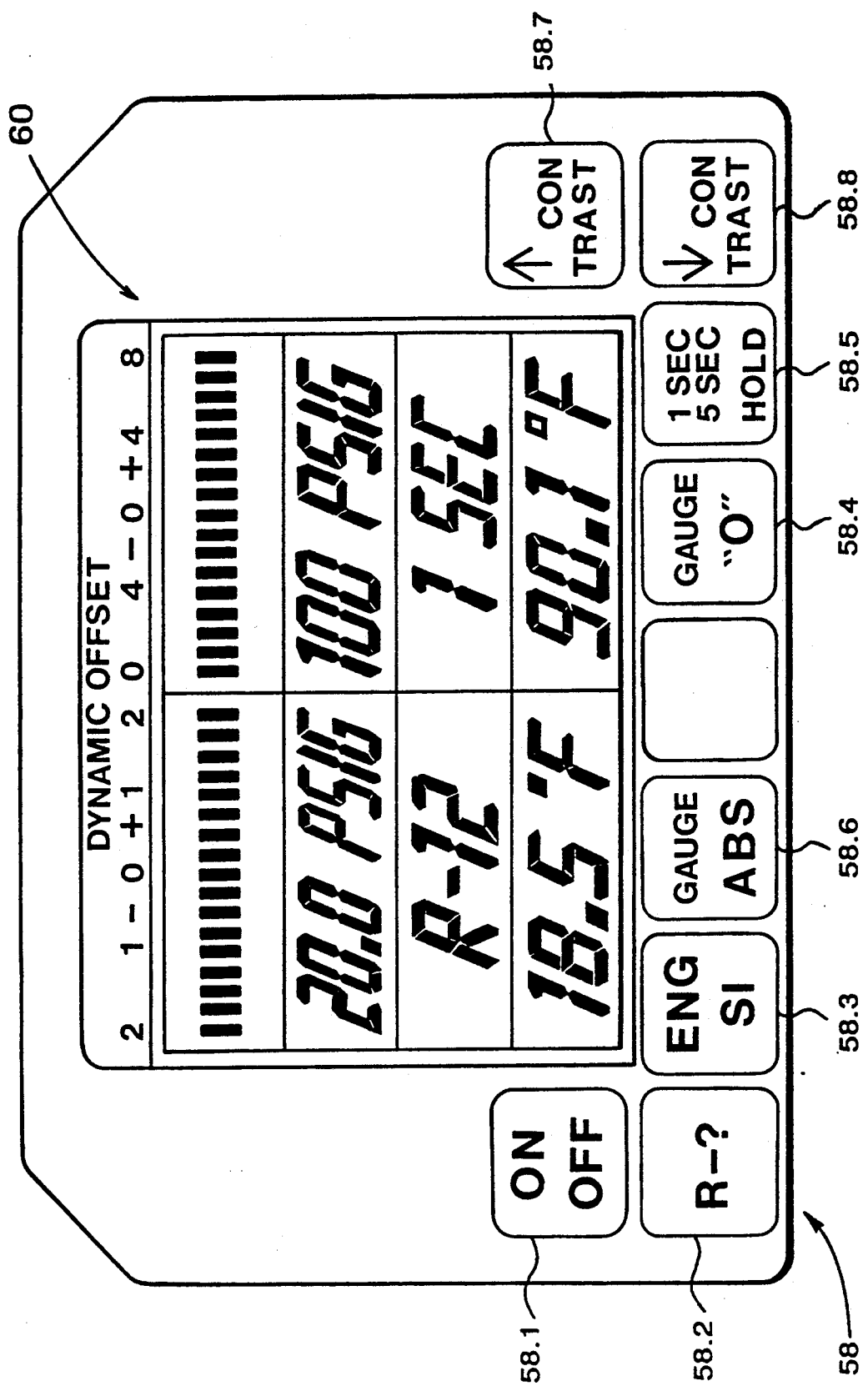
FIG. 3 is a schematical representation of a keypad and display of the pressure measuring system of FIG. 2.

With reference to FIG. 3, an illustration of the keypad 58 and display 60 are shown. The keypad 58 has eight keys, referenced 58.1 through 58.8, which, respectively, are as follows:

| | |
|---|---|
| (i) | an ON/OFF key (58.1); |
| (ii) | a key for selecting a refrigerant type (58.2); |
| (iii) | a key for selecting the type of units required, i.e. metric or non-metric (58.3); |
| (iv) | a key for resetting the system to zero values (58.4); |
| (v) | a key for selecting the interval between updates of the displayed values, e.g., one second or five seconds, or to select a no-update feature in which the displayed data is not updated (58.5); |
| (vi) | a key for selecting the units of the pressure being displayed (58.6); |
| (vii) | a key for adjusting the contrast up (58.7); and |
| (viii) | a key for adjusting the contrast down (58.8). |

An LCD controller 62 for the LCD display 60 is also provided. The controller 62 and the display 60 may be combined or separate or the controller 62 may be built into the microprocessor 54. In the present example, the controller 62 is separate. The control output voltages are modified by the microprocessor 54 under control of the contrast adjustment keys 58.7, 58.8. In the present example, the display is made up of four lines, as illustrated in FIG. 3. The first line comprises two bar graphs, one for the low pressure side and one for the high pressure side, which indicate the pressure deviation, either up or down, from the currently displayed values. The second line displays the high and low pressures along with the units of measurement. The third line displays the refrigerant type, the update interval and the battery status. The fourth line displays the calculated boiling point temperature and units, based on the pressure and the refrigerant type. Additional display items may be included, as desired, such as refrigerant weight, discharged weight, etc.

The power supply section 48 is adapted to accommodate a six-volt battery as power source and comprises a power regulator 64 for regulating the battery voltage to the system 40 as well as turning the system 40 on and off under the ON/OFF key 58.1 and to automatically shut the system 40 off after a predetermined period of non-use.

The system 40 is software driven which includes arithmetic subroutines; an interpolation subroutine; LCD driver, analog-to-digital converter driver; timer driver; EEPROM driver; and a power saver driver (auto shut-off).

As the sampled analog values are represented in ten bits, appropriate add, subtract, multiplication and division subroutines are used. The majority of these subroutines are used by the interpolation program that calculates the boiling point temperatures for a given refrigerant and pressure. The interpolation subroutine uses linear approximation to determine the refrigerant boiling point temperature at a given pressure. The coefficient table provides several pressure/temperature points. The interpolation routine determines which two points surround a given pressure and then performs the following calculation:

$$T_P = T_1 - \left[ \frac{(P_1 - P)(T_1 - T_2)}{(P_1 - P_2)} \right]$$

where:
$T_P$ = refrigerant boiling point temperature at a given pressure
$T_1$ = temperature high point
$T_2$ = temperature low point
$P_1$ = pressure high point
$P_2$ = pressure low point The drivers interface with the respective hardware to provide a simple interface for system calls.

Pressure data is sampled 32 times per second. Every eight samples are averaged to reduce effects of system and external noise. Four times a second the averaged values are compared to the last displayed value. The difference is displayed in the form of a bar graph. Depending on the update display value, the displayed value is adjusted every 1 or 5 seconds, depending on the specific setting. Alternatively, if the no-update (hold) feature has been selected, the displayed data is not updated.

The system 40 is particularly suitable for use with the modern-day ternary blend refrigerants having temperature pressure relationships which depart from the conventional industry standards. If desired, a flow monitoring device and means for sampling the temperature at predetermined locations in the refrigeration system can be provided for the determination of real time system capacity, e.g. refrigerant contamination (partial loss of the ternary charge) or partial mechanical failure.

The system according to the invention may also include a select load cell weight measuring device to permit accurate monitoring of refrigerant recovery and system charging.

The system can further be programmed to monitor the refrigeration system it is connected to and at preprogrammed intervals sample and store these values for later processing.

While only preferred embodiments of the invention have been described herein in detail, the invention is not limited thereby and modifications can be made within the scope of the attached claims.

What is claimed is:

1. A pressure measuring system for a refrigeration system, comprising:
    conversion means for converting a pressure being measured into a digital signal representing said measured pressure;
    processing means for calculating a corresponding boiling point temperature for a selected refrigerant at said measured pressure;
    refrigerant selection means for selectively inputting into said processing means the boiling point temperature-pressure relationship or coefficient of said selected refrigerant;
    display means for displaying said measured pressure and the calculated boiling point temperature;
    wherein said processing means further comprises means for continuously performing successive calculations as said measured pressure varies with time and update means for updating the pressure and boiling point temperature values displayed by said display means at predetermined intervals; and
    control means for activating said display means to indicate the direction of a pressure change, upward or downward, during said predetermined time intervals in between said updating of the pressure and temperature values.

2. The pressure measuring system according to claim 1, wherein said refrigerant selection means comprises a memory for storing the boiling point temperature-pressure relationship of a plurality of different refrigerants.

3. The pressure measuring system according to claim 1, wherein said refrigerant selection means comprises an interface for receiving a plug-in memory chip containing the boiling point temperature-pressure relationship of a particular refrigerant.

4. The pressure measuring system according to claim 1, wherein said predetermined time intervals is selectable from the group of intervals consisting of one-second and five-second intervals.

5. The pressure measuring system according to claim 1, wherein said conversion means comprises a transducer for converting said measured pressure into an analog electric signal and an analog-digital converter for converting the analog signal to a digital signal for inputting into said processing means.

6. The pressure measuring system according to claim 5, comprising a pair of said transducers for connection to the high and low pressure sides of a refrigeration system, respectively.

* * * * *

(12) EX PARTE REEXAMINATION CERTIFICATE (8099th)
United States Patent
Lockhart et al.

(10) Number: US 5,311,745 C1
(45) Certificate Issued: Mar. 22, 2011

(54) PRESSURE MEASUREMENT SYSTEM FOR REFRIGERATION SYSTEM

(75) Inventors: Douglas L. Lockhart, Cobble Hill (CA); Oreste B. N. Varelas, Vancouver (CA)

(73) Assignee: PNC Bank - National Association, Philadelphia, PA (US)

Reexamination Request:
No. 90/010,589, Jul. 30, 2009

Reexamination Certificate for:
Patent No.: 5,311,745
Issued: May 17, 1994
Appl. No.: 08/009,671
Filed: Jan. 27, 1993

(51) Int. Cl.
*G05D 23/00* (2006.01)
*G01L 19/08* (2006.01)
*G01L 19/00* (2006.01)
*F25B 49/00* (2006.01)

(52) U.S. Cl. ............................................ 62/127; 62/129
(58) Field of Classification Search ................ 62/127
See application file for complete search history.

(56) References Cited

U.S. PATENT DOCUMENTS 5,209,076 A * 5/1993 Kauffman et al. ............ 62/126
5,209,400 A * 5/1993 Winslow et al. ............... 236/94

OTHER PUBLICATIONS

Fluke 75/77 Multimeter Operator's Manual (1 page), "Fluke I", May 1992.*
Fluke PV350 Pressure/Vacuum Transducer Module Instruction Sheet, (7 pages), "Fluke II", May 1992.*
Fluke PV350 Pressure/Vacuum Transducer Module Quick Reference Card, (1 sheet), "Fluke III", Jun. 1992.*
The Pressure Strain and Force Handbook, Omega Engineering Inc., (6 pages), "Omega", 1990.*

* cited by examiner

*Primary Examiner*—Catherine S. Williams

(57) ABSTRACT

A pressure measuring system for a refrigeration system, such as a refrigeration system used in a commercial air conditioning system, comprises a converter (42) for converting a pressure being measured into a digital signal representing the measured pressure and a processor (54) for calculating a corresponding boiling point temperature for a selected refrigerant at the measured temperature. The system also includes a selector for selectively inputting the boiling point temperature-pressure relationship or coefficient of a selected refrigerant into the processor, as well as a display (60) for displaying the measured pressure and the calculated boiling point temperature.

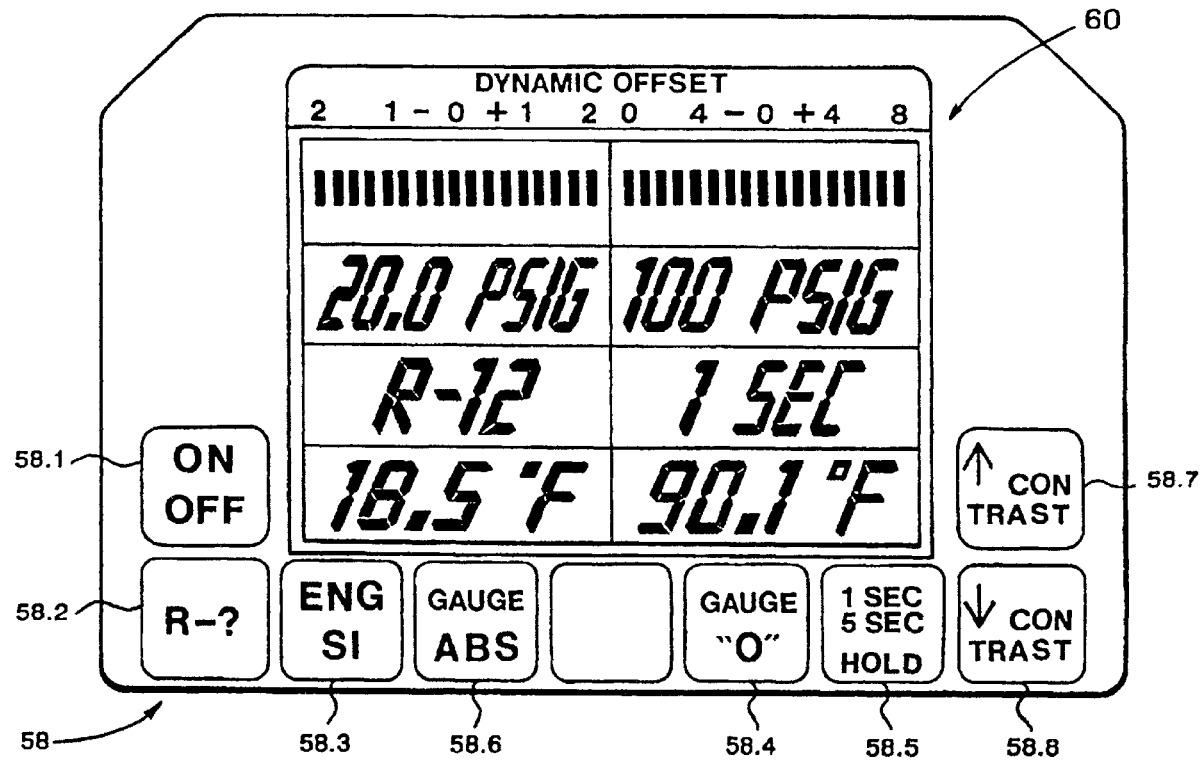

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-6, dependent on an amended claim, are determined to be patentable.

1. A pressure measuring system for a refrigeration system, comprising:
   conversion means for converting a pressure being measured into a digital signal representing said measured pressure;
   processing means for calculating a corresponding boiling point temperature for a selected refrigerant at said measured pressure;
   refrigerant selection means for selectively inputting into said processing means the boiling point temperature-pressure relationship or coefficient of said selected refrigerant;
   display means for displaying said measured pressure and the calculated boiling point temperature;
   wherein said processing means further comprises means for continuously performing successive calculations as said measured pressure varies with time and update means for updating the pressure and boiling point temperature values displayed by said display means at predetermined intervals; and
   control means for activating said display means to indicate the direction of a pressure change, upward or downward, *compared to the currently displayed values* during said predetermined time intervals [in between] *before* said updating of the *displayed* pressure and temperature values.

* * * * *